(No Model.)
A. MONTGOMERY.
ELASTIC CORE SEMI-METALLIC PACKING.
No. 557,855. Patented Apr. 7, 1896.
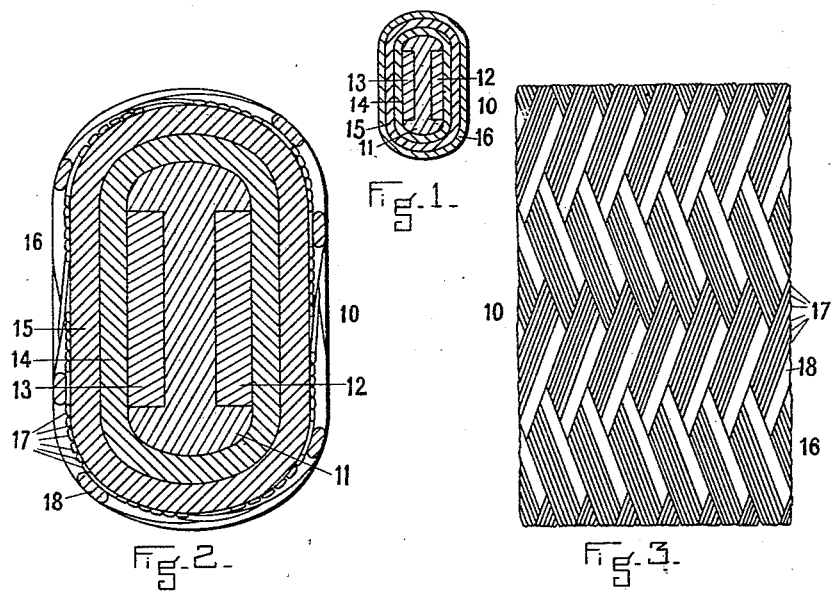
Fig. 1.
Fig. 2.
Fig. 3.
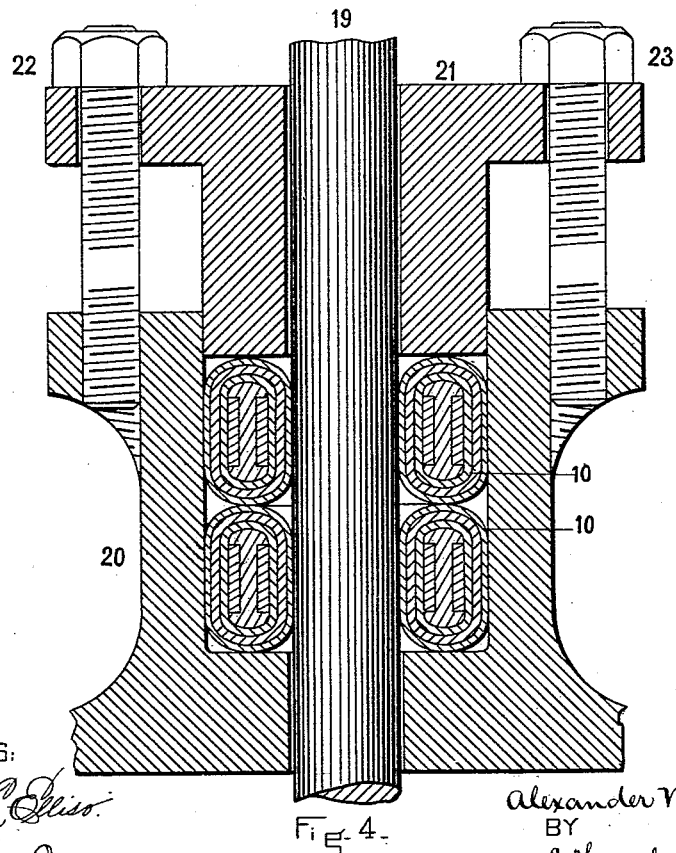
Fig. 4.
WITNESSES:
Charles L. Elliss.
Robert H. Orr.
INVENTOR:
Alexander Montgomery.
BY
E. Frank Woodbury.
ATTORNEY.

UNITED STATES PATENT OFFICE.

ALEXANDER MONTGOMERY, OF NEWTON, MASSACHUSETTS.

ELASTIC-CORE SEMIMETALLIC PACKING.

SPECIFICATION forming part of Letters Patent No. 557,855, dated April 7, 1896.

Application filed December 6, 1894. Serial No. 531,044. (No specimens.)

*To all whom it may concern:*

Be it known that I, ALEXANDER MONTGOMERY, a citizen of the United States, residing at Newton, in the county of Middlesex and Commonwealth of Massachusetts, have invented certain new and useful Improvements in Elastic - Core Semimetallic Packing, of which the following is a specification.

My invention relates to elastic-core semimetallic packings designed for use upon piston-rods and the like, and it is especially designed for use in places where high pressures of steam and of other gases or fluids are used.

My invention has for its object the production of an efficient and durable packing, especially when subjected in use to high pressures. It is designed as an improvement upon the invention for which Letters Patent of the United States were granted to me for an elastic-core packing December 27, 1887, No. 375,501. Packings made in accordance with this patent have been successfully used in very large quantities; but the modern tendency of using steam at very high pressures has necessitated the invention, as hereinafter described, of the elastic-core semimetallic packing, which fully meets all conditions of modern use.

Figure 1 represents the packing in full-size cross-section. Fig. 2 is the same as Fig. 1 except that the packing is three times full size. Fig. 3 represents in side elevation a small piece of packing as shown by Fig. 2, and it is drawn in the same scale—namely, three times full size—in order to represent more clearly the formation of the semimetallic covering. Fig. 4 represents in sectional view the application of the packings to a piston-rod within a stuffing-box of an ordinary class.

The packing 10 is made as follows: The I-shaped core 11 is made of soft rubber, and between its flanges are placed the strips 12 and 13, which are made of rubber that is preferably harder than the rubber I-core, or the strips may be made of any other well-known elastic substance, such as compressed cork. The composite core thus obtained is covered or has woven or braided around it the layers 14 and 15 of asbestos, cotton, or other suitable well-known fibrous material, which are impregnated with some suitable lubricant, such as a compound of graphite and paraffin or oil. The packing up to this stage of manufacture is substantially the same as shown and described in the said Patent No. 375,501. The use of high pressures compels the employment of an outside retaining-covering composed of metal wires in order to render the packing serviceable, and at the same time the covering must be flexible or else the packing would have but little value when applied especially to piston-rods of small diameter. In order to accomplish these results, I have, after a long series of experiments, succeeded in making an effective semimetallic flexible covering, as shown in the drawings, which is made as follows: The semimetallic covering 16 is woven or braided around the outer covering 15, and each strand is composed of metal wire and cotton fiber. In the drawings each strand is made of the six wires, as 17, preferably brass wires, and of the one thread, as 18, preferably cotton thread. The packing covered with this thin semimetallic covering of brass wire and cotton composed of one thickness of flat strands possesses nearly all its original flexibility—that is to say, the flexibility it possessed before the application of the semimetallic covering—and at the same time the packing is thoroughly protected and its efficiency greatly increased by reason of its semimetallic covering. After the application of the semimetallic covering the packing is coated or charged with some suitable lubricant, after which coating the packing is ready for use. It is essential that the outer covering should be semimetallic and that the strands should be composed of parallel fibers of metal and cotton or other fibrous material.

Fig. 4 is an illustration of the application of the two packings, as 10, to the piston-rod 19, the packings being placed within the stuffing-box 20, and they are forced into position by means of the gland 21 and the stud-bolts 22 and 23.

By making the rubber core I-shaped and by making the semimetallic covering of metal and cotton fibers, each strand of the covering having its fibers parallel, I am able to produce an elastic flexible protected packing possessing compound elastic qualities that are valuable and very useful.

What I claim as new, and desire to secure by Letters Patent, is—

1. A packing consisting of a flexible body, and a thin, woven, seamless, tubular covering therefor, said covering consisting of one thickness of flat strands composed of metallic and fibrous threads.

2. A packing consisting of an elastic core, layers of fibrous material wound around said core, said layers being charged with a suitable lubricant, and a thin, woven, covering therefor, consisting of one thickness of flat strands composed of metallic and fibrous threads, said covering being integral around the entire core.

3. A packing consisting of an elastic I-shaped core surrounded by layers of fibrous material charged with a suitable lubricant, and a thin, seamless, tubular covering therefor, consisting of one thickness of flat strands composed of metallic and fibrous threads.

In testimony whereof I have signed my name to this specification in the presence of two subscribing witnesses.

ALEXANDER MONTGOMERY.

Witnesses:
E. FRANK WOODBURY,
GEORGE L. DOLBEARE.